US012438470B2

(12) United States Patent
Mallik et al.

(10) Patent No.: US 12,438,470 B2
(45) Date of Patent: Oct. 7, 2025

(54) PEAK EFFICIENCY TRACKING IN AN LLC CONVERTER OF A MULTI-STAGE POWER CONVERSION SYSTEM

(71) Applicant: STMicroelectronics International N.V., Geneva (CH)

(72) Inventors: Ranajay Mallik, Ghaziabad (IN); Akshat Jain, Nahan (IN)

(73) Assignee: STMicroelectronics International N.V., Geneva (CH)

( * ) Notice: Subject to any disclaimer, the term of this patent is extended or adjusted under 35 U.S.C. 154(b) by 200 days.

(21) Appl. No.: 18/232,185

(22) Filed: Aug. 9, 2023

(65) Prior Publication Data

US 2025/0055376 A1    Feb. 13, 2025

(51) Int. Cl.
*H02M 3/335* (2006.01)
*H02M 1/00* (2006.01)
*H02M 3/00* (2006.01)
*H02M 7/48* (2007.01)

(52) U.S. Cl.
CPC ..... *H02M 3/33573* (2021.05); *H02M 1/0058* (2021.05); *H02M 3/01* (2021.05); *H02M 3/33571* (2021.05); *H02M 7/4815* (2021.05)

(58) Field of Classification Search
CPC ......... H02M 3/33571; H02M 3/33573; H02M 7/4815; H02M 1/4241; H02M 3/01; H02M 1/0058; H02M 1/0032
See application file for complete search history.

(56) References Cited

U.S. PATENT DOCUMENTS

| 9,467,054 | B2* | 10/2016 | Dai | H02M 3/335 |
| 2014/0160805 | A1* | 6/2014 | Oh | H02M 1/4258 |
| | | | | 363/21.02 |
| 2014/0268904 | A1 | 9/2014 | Reddy et al. | |
| 2015/0109824 | A1 | 4/2015 | Chen et al. | |
| 2015/0109833 | A1 | 4/2015 | Garrity et al. | |
| 2015/0124492 | A1* | 5/2015 | Fu | H02M 3/33546 |
| | | | | 363/21.02 |
| 2016/0294294 | A1* | 10/2016 | Ye | H02M 3/33592 |
| 2016/0352229 | A1 | 12/2016 | Norimatsu et al. | |
| 2022/0131470 | A1 | 4/2022 | Sagneri et al. | |

* cited by examiner

*Primary Examiner* — Alex Torres-Rivera
(74) *Attorney, Agent, or Firm* — Slater Matsil, LLP

(57) ABSTRACT

According to an embodiment, an LLC resonant converter includes a switching bridge having a plurality of power switches. The switching bridge is configured to receive a DC voltage input and generate a square waveform based on a pulse-modulated frequency (PFM) signal at the switching bridge. The LLC resonant converter further includes a resonant tank circuit coupled to the switching bridge. The resonant tank circuit includes a resonant inductor. The resonant tank circuit is excited in response to receiving the square waveform. The PFM signal is adjusted such that an elapsed time between a rising edge of a Drain-Source Voltage of a power switch and a zero-crossing point of current flowing through the resonant inductor falls within a predetermined range corresponding to the resonant tank circuit operating at its resonant frequency.

20 Claims, 5 Drawing Sheets

PEAK EFFICIENCY TRACKING IN AN LLC CONVERTER OF A MULTI-STAGE POWER CONVERSION SYSTEM

TECHNICAL FIELD

The present disclosure generally relates to power conversion systems and, in particular embodiments, to an efficient operation of a multi-stage power conversion system.

BACKGROUND

Generally, a multi-stage power conversion system includes multiple converters that transform electrical energy from one form to another to meet specific power requirements. A typical power system includes a first-stage DC-DC converter and a second-stage DC-AC converter. Combining a first-stage DC-DC converter and a second-stage DC-AC converter enables efficient power conversion, voltage regulation, isolation, and adaptation of power sources for various applications requiring different voltage levels and AC power.

DC-DC converters are commonly used to regulate the voltage level, provide isolation, or convert energy from a renewable source like solar panels or batteries to a voltage suitable for further processing. A popular choice in high-power applications, such as server power supplies, industrial power systems, and electric vehicle chargers, is a DC-DC power converter based on the LLC resonant topology. Such DC-DC power converters utilize resonant components to achieve high efficiency and improved performance.

The LLC resonant converter operates in a resonant mode, where the switching of the power devices (usually MOSFETs or IGBTs) is synchronized with the resonant frequency of the tank circuit. This synchronization minimizes switching losses and improves efficiency. LLC resonant converters require a control mechanism to regulate the output voltage. Typically, a pulse width modulation (PWM) control scheme is employed, where the power devices' switching frequency and duty cycle are adjusted based on the load and input voltage variations. Advanced control techniques such as frequency modulation and phase-shift modulation can also be implemented to optimize efficiency and performance.

An input of the DC-AC converter is coupled to the output of the DC-DC converter. The DC-AC converter, also known as an inverter, converts the DC voltage from the DC-DC converter into AC voltage. This stage is particularly useful when the load or application requires AC power, such as in residential and commercial buildings, industrial machinery, or grid-tied systems. DC-AC converters typically use high-frequency switching techniques to convert the input DC voltage into AC voltage.

A common type of inverter is the pulse-width modulation (PWM) inverter, which uses switches (usually semiconductor devices like MOSFETs or IGBTs) to control the output voltage by varying the width of the pulses. The switching frequency of the inverter determines the quality of the output waveform, with higher frequencies providing a better approximation to a sinusoidal waveform. The output of the DC-AC converter can be single-phase or three-phase AC power, depending on the specific application requirements. These converters often incorporate additional features such as voltage and frequency control, protection mechanisms, and communication interfaces for monitoring and control purposes.

The efficiency of the DC-DC converter and the DC-AC converter determine the power conversion system efficiency. Generally, the LLC-type DC-DC converter operates at max efficiency when the system operates at the resonant frequency of the tank circuit, which is limited to when the input voltage to the DC-DC converter is at a specific voltage or within a small range of voltages and the load at the output. Thus, when the input voltage to the DC-DC converter is outside the desired voltage range, the system operates outside of peak efficiency. A circuit, system, and method for operating a multi-stage power conversion system that operates at max efficiency across a large range of input voltages at an input of the DC-DC converter are desirable.

SUMMARY

Technical advantages are generally achieved by embodiments of this disclosure which describe an efficient operation of a multi-stage power conversion system.

A first aspect relates to an LLC resonant converter. The LLC resonant converter includes a switching bridge having a plurality of power switches. The switching bridge is configured to receive a DC voltage input and generate a square waveform based on a pulse-modulated frequency (PFM) signal at the switching bridge. The LLC resonant converter further includes a resonant tank circuit coupled to the switching bridge. The resonant tank circuit includes a resonant inductor. The resonant tank circuit is excited in response to receiving the square waveform. The PFM signal is adjusted such that an elapsed time between a rising edge of a Drain-Source Voltage of a power switch and a zero-crossing point of current flowing through the resonant inductor falls within a predetermined range corresponding to the resonant tank circuit operating at its resonant frequency.

A second aspect relates to a multi-stage power conversion system. The multi-stage power conversion system includes an LLC resonant converter, an H-bridge DC-AC converter, and a control circuit. The LLC resonant converter includes a switching bridge and a resonant tank circuit. The H-bridge DC-AC converter is coupled to the LLC resonant converter. The H-bridge DC-AC converter is configured to generate a regulated output voltage. The control circuit is configured to determine an elapsed time between a rising edge of a Drain-Source Voltage (VDS) of a power switch in the switching bridge and a zero-crossing point of current flowing through a resonant inductor in the resonant tank circuit; adjust a pulse-frequency modulation (PFM) signal at the switching bridge such that the elapsed time falls within a predetermined range corresponding to the resonant tank circuit operating at its resonant frequency; and regulate an output voltage of the H-bridge DC-AC converter by varying a modulation index of a sinusoidal pulse-width-modulated (PWM) control signal at the H-Bridge DC-AC converter.

A third aspect relates to a method for operating a multi-stage power conversion system comprising an LLC resonant converter and an H-bridge DC-AC converter. The method includes determining an elapsed time between a rising edge of a Drain-Source Voltage (VDS) of a power switch in a switching bridge of the LLC resonant converter and a zero-crossing point of current flowing through a resonant inductor in a resonant tank circuit of the LLC resonant converter; adjusting a pulse-frequency modulation (PFM) signal at the switching bridge such that the elapsed time falls within a predetermined range corresponding to the resonant tank circuit operating at its resonant frequency; and regulating an output voltage of the H-bridge DC-AC converter by varying a modulation index of a sinusoidal pulse-width-modulated (PWM) control signal at the H-Bridge DC-AC converter.

A fourth aspect relates to an LLC resonant converter. The LLC resonant converter includes a switching bridge having a plurality of power switches. The switching bridge is configured to receive a DC voltage input and generate a square waveform based on a pulse-modulated frequency (PFM) signal at the switching bridge. The LLC resonant converter further includes a resonant tank circuit coupled to the switching bridge and comprising a resonant inductor. The resonant tank circuit is excited in response to receiving the square waveform. The PFM signal is adjusted such that an elapsed time from a rising edge of a Drain-Source Voltage of a power switch to a peak value of current flowing through the resonant inductor falls within a predetermined range corresponding to the resonant tank circuit operating at its resonant frequency.

A fifth aspect relates to a multi-stage power conversion system. The multi-stage power conversion system includes an LLC resonant converter, an H-bridge DC-AC converter, and a control circuit. The LLC resonant converter includes a switching bridge and a resonant tank circuit. The H-bridge DC-AC converter is coupled to the LLC resonant converter. The H-bridge DC-AC converter is configured to generate a regulated output voltage. The control circuit is configured to determine an elapsed time from a rising edge of a Drain-Source Voltage of a power switch in the switching bridge to a peak value of current flowing through a resonant inductor of the resonant tank circuit; adjust a pulse-frequency modulation (PFM) signal at the switching bridge such that the elapsed time falls within a predetermined range corresponding to the resonant tank circuit operating at its resonant frequency; and regulate an output voltage of the H-bridge DC-AC converter by varying a modulation index of a sinusoidal pulse-width-modulated (PWM) control signal at the H-Bridge DC-AC converter.

A sixth aspect relates to a method for operating a multi-stage power conversion system comprising an LLC resonant converter and an H-bridge DC-AC converter. The method includes determining an elapsed time from a rising edge of a Drain-Source Voltage of a power switch of a switching bridge in the LLC resonant converter to a peak value of current flowing through a resonant inductor of a resonant tank circuit in the LLC resonant converter; adjusting a pulse-frequency modulation (PFM) signal at the switching bridge such that the elapsed time falls within a predetermined range corresponding to the resonant tank circuit operating at its resonant frequency; and regulating an output voltage of the H-bridge DC-AC converter by varying a modulation index of a sinusoidal pulse-width-modulated (PWM) control signal at the H-Bridge DC-AC converter.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of an uninterruptible power supply (UPS) backup system in a high-current application, it should also be appreciated that these inventive aspects may also apply to other fields. In particular, aspects of this disclosure may similarly apply to various commercial, consumer, and industrial applications, such as vehicular battery systems, power systems in solar-powered homes, and the like.

Figure 1:
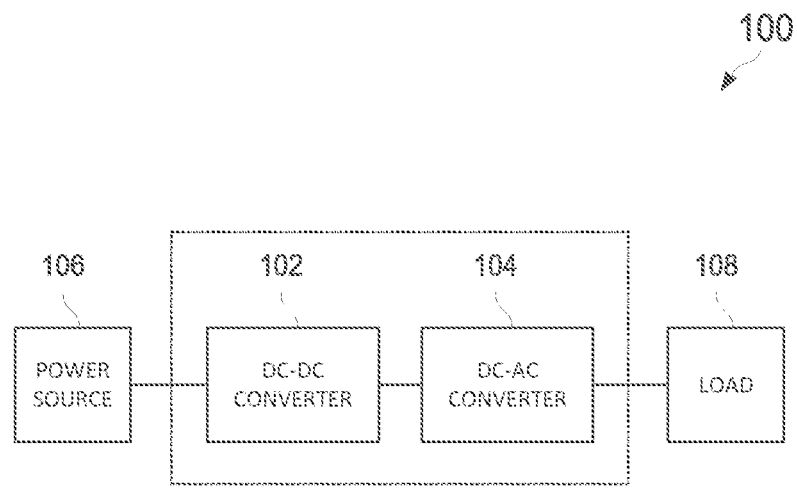
FIG. 1 is a block diagram of an embodiment multi-stage power conversion system.

FIG. 1 illustrates a block diagram of an embodiment multi-stage power conversion system 100. Multi-stage power conversion system 100 includes a DC-DC converter 102 and a DC-AC converter 104, which may (or may not) be arranged as shown. Multi-stage power conversion system 100 may include additional components not shown, such as filter circuits, control circuits, or the like. In embodiments, multi-stage power conversion system 100 is a dual-stage cascaded power converter system.

The input to the DC-DC converter 102 is provided by a power source 106, such as a vehicular battery supply, solar panels, etc. The output of the DC-AC converter 104 is coupled to a load 108, such as a load coupled to an outlet of a home, a vehicle, or the like.

Multi-stage power conversion system 100 is configured to convert the input voltage from the power source 106 to a regulated AC output at load 1o8. In embodiments, DC-DC converter 102 is configured to convert the input voltage from the power source 106 to a high-frequency AC voltage using, for example, a resonant tank circuit. The AC voltage is transformed using a transformer of the DC-DC converter 102 and rectified by a rectifier in the DC-DC converter 102 to produce a DC output voltage. The DC output voltage is then converted by the DC-AC converter 104 to produce a regulated AC output voltage for load 108.

In embodiments, power source 106 is a DC power source, that provides a DC input voltage between 42 and 56 volts, with a maximum input current of 36 amps. In embodiments, DC-DC converter 102 provides a DC output voltage between 325 and 400 volts to the DC-AC converter 104.

Figure 2:
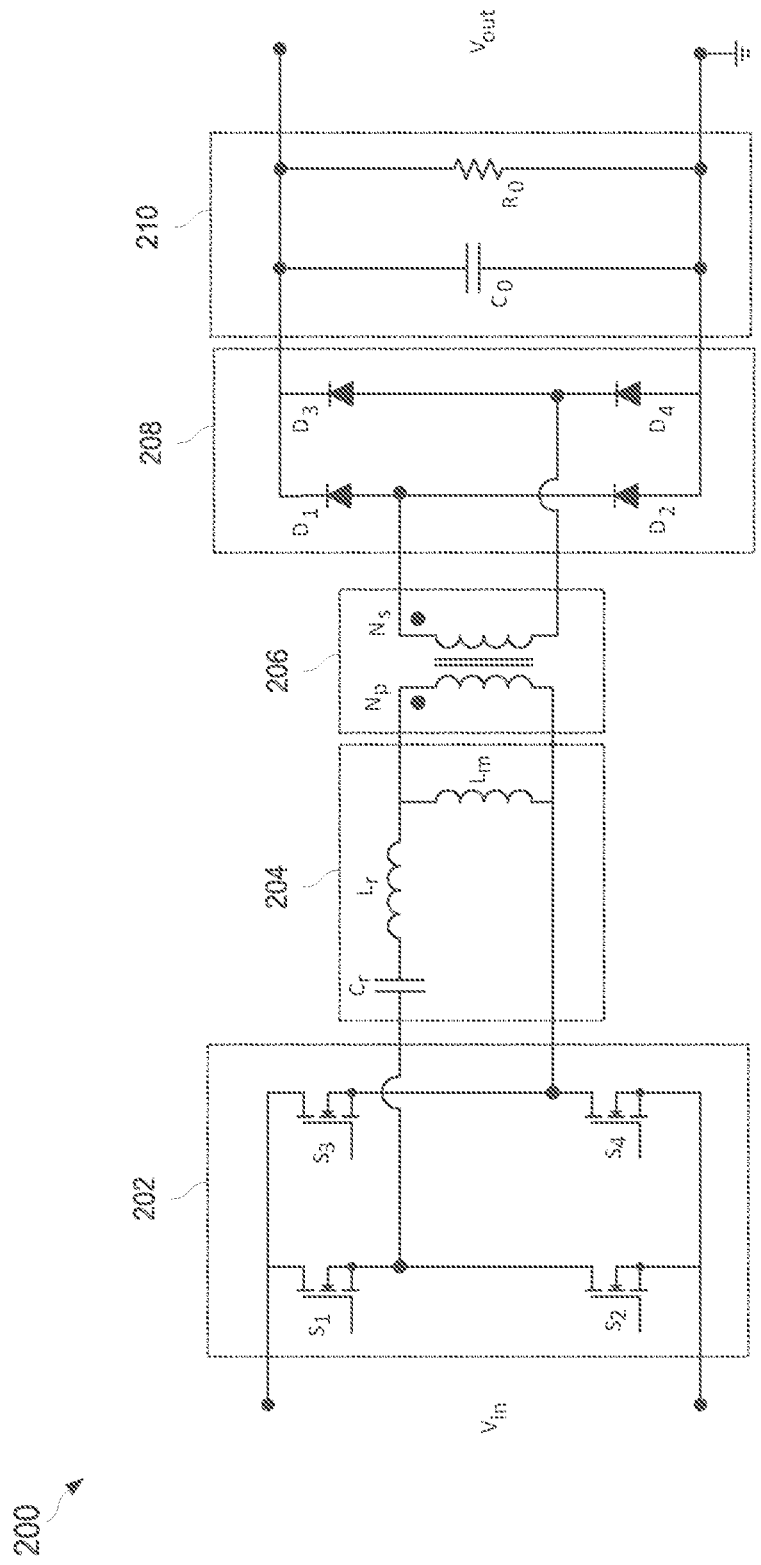
FIG. 2 is a simplified schematic of an embodiment LLC resonant converter, which may be implemented as the DC-DC converter in the multi-stage power conversion system of FIG. 1.

FIG. 2 illustrates a simplified schematic of an embodiment LLC resonant converter 200, which may be implemented as the DC-DC converter 102 in the multi-stage power conversion system 100. As shown, LLC resonant converter 200 includes a switching bridge 202, a resonant tank circuit 204, a transformer 206, an output rectifier 208, and an optional output filter 210, which may (or may not) be arranged as shown. LLC resonant converter 200 may include additional components not shown. For example, LLC resonant converter 200 may include an input filter circuit, control circuit, or the like.

Switching bridge 202 turns a DC input voltage ($V_{in}$) into a high-frequency square wave using a switch network (also known as power switches) arranged as either a half- or full-bridge to feed the resonant tank circuit 204. In turn, the resonant tank circuit 204 eliminates the square wave's harmonics and outputs a resonant sinusoidal-like voltage and current to transformer 206. Transformer 206 scales the voltage up or down according to the application. Output rectifier 208 rectifies the scaled resonant sinusoidal current to a stable DC output. The output filter 210 filters the rectified AC current and outputs a DC voltage ($V_{out}$) at the LLC resonant converter 200 output.

In embodiments, switching bridge 202 generates a square waveform to excite resonant tank circuit 204. In embodiments, switching bridge 202 is a full-bridge, as shown in FIG. 2 (i.e., four MOSFET power switches $S_1$, $S_2$, $S_3$, and $S_4$). In some embodiments, however, switching bridge 202 is a half-bridge, which can be implemented, for example, with only transistors $S_1$ and $S_2$ and reference ground.

The width of the square pulses of the square waveform is controlled by the switching frequency ($f_{sw}$) of the power switches in the switching bridge. By adjusting the width of the square pulses, the switching frequency controls the operating mode of the resonant tank circuit 204, such that the resonant tank circuit 204 is operating at either below, at, or above the resonant frequency ($f_o$) of the resonant tank circuit 204.

As shown, resonant tank circuit 204 includes a resonant inductor ($L_r$), a magnetizing inductor ($L_m$), and a resonant capacitor ($C_r$), which provide the L-L-C naming of the LLC resonant converter 200. In embodiment, resonant inductor ($L_r$) is arranged in series with the resonant capacitor ($C_r$) and transformer 206 and in parallel with the magnetizing inductor ($L_m$). It is noted that other arrangements of the resonant inductor ($L_r$), resonant capacitor ($C_r$), and magnetizing inductor ($L_m$) are also contemplated. Generally, the combination of the resonant inductor ($L_r$) and magnetizing inductor ($L_m$) allows resonant tank circuit 204 to respond to a much larger range of loads.

In embodiments, the inductance of the resonant inductor ($L_r$) is 2.1 micro-henry. In embodiments, the capacitance of the resonant capacitor ($C_r$) is 1950 nano-farads. In embodiments, the inductance of the magnetic inductor ($L_m$) is 8.2 micro-henry.

Transformer 206 provides voltage scaling and primary-secondary isolation. Transformer 206 couples energy between the primary and secondary sides of LLC resonant converter 200. Transformer 206 includes a first winding ($N_p$) and a second winding ($N_s$). The primary side of transformer 206 is coupled to the resonant tank circuit 204, while the secondary side is coupled to the output rectifier 208.

Generally, output rectifier 208 includes diodes (e.g., four diodes $D_1$, $D_2$, $D_3$, and $D_4$) or synchronous rectifiers that allow current flow in one direction, resulting in a unidirectional DC output. In embodiments, output rectifier 208 is a full bridge rectifier.

Output filter 210 is used to smooth out residual ripple or high-frequency noise at the output of output rectifier 208 and provide a clean DC output voltage for the DC-AC converter 104. Output filter 210 may include capacitors, resistors, and inductors and arranged as known in the art.

A control circuit, such as the control circuit 400, coupled to LLC resonant converter 200 can control the power flow of the LLC resonant converter 200 by modulating the square wave frequency of the switching frequency provided to the power switches and operating resonant tank circuit 204 at its resonant frequency. The control circuit can use feedback mechanisms and control algorithms to adjust the switching frequency, duty cycle, and phase shift to achieve the desired output voltage regulation.

Typically, DC-DC converters employing the LLC topology are designed to function at resonance with a specific input voltage. However, when the input voltage varies, these converters no longer operate within their most efficient range. For instance, in a UPS backup system where a fully charged battery is the power source, the DC-DC converter deviates from resonance and operates at a higher frequency. Similarly, the DC-DC converter operates below resonance when fully discharging the battery. As a result, the converter operates less efficiently across these voltage ranges. This reduces critical parameters such as battery backup time in the case of, for example, the UPS backup system, which begins operation from fully charged until fully discharged in the event of a power loss. Additionally, variations in the magnetic components' production tolerances, such as differences in capacitance and inductance, can cause an efficiency decrease of nearly 1%. This issue is particularly problematic in applications that involve low voltage and high current.

Embodiments of this disclosure provide a multi-stage power conversion system 100 with an LLC resonant converter 200 that operates in open-loop tracking mode. LLC resonant converter 200 is configured to measure the time elapsed between voltage, current zero-crossings, and peak currents and set the switching frequency of switching bridge 202, such that the resonant tank circuit 204 is forced to operate at its resonant frequency. As LLC resonant converter 200 is operating at a fixed frequency corresponding to the resonant frequency of resonant tank circuit 204, LLC resonant converter 200 operates at peak efficiency regardless of the DC input voltage ($V_{in}$).

In these embodiments, as the DC-AC converter 104 is no longer receiving a fixed DC input voltage, aspects of this disclosure provide a method of maintaining output voltage regulation at the output of the multi-stage power conversion system by modulating the modulation index (MI) of the sinusoidal pulse-width-modulated (PWM) at the H-Bridge forming the DC-AC converter 104. These and further details are discussed in greater detail below.

Figure 3:
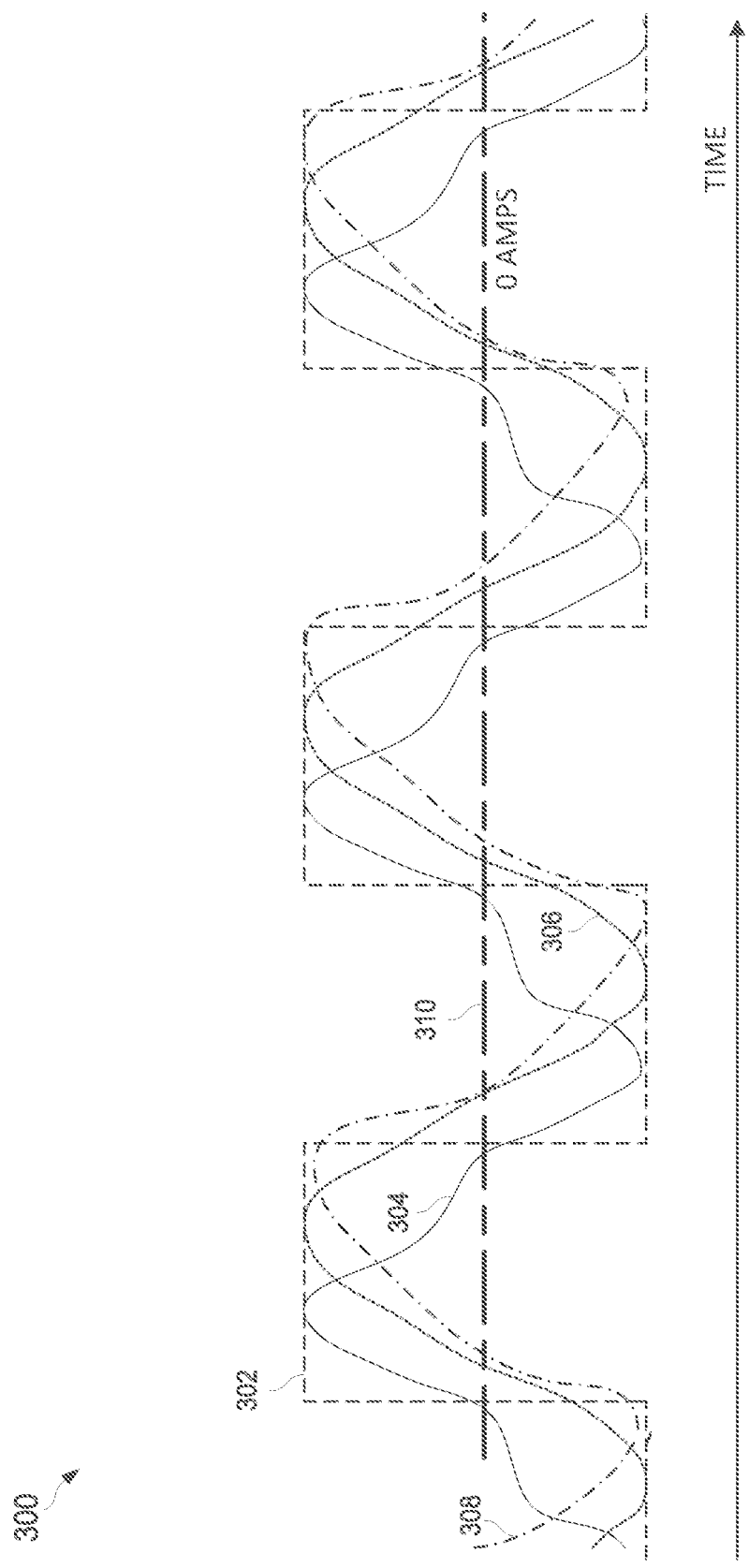
FIG. 3 are embodiment waveforms for different LLC resonant converter operating modes over time.

FIG. 3 illustrates embodiment waveforms 300 for different LLC resonant converter 200 operating modes over time. LLC resonant converter 200 can operate in three modes: (i) below the resonant frequency of the resonant tank circuit 204, (ii) at the resonant frequency of the resonant tank circuit 204, and (iii) above the resonant frequency of the resonant tank circuit 204. It is noted that the amplitude and time durations of the waveforms 300 in FIG. 3 are for illustration only and are not meant to convey differences in value at the three different operating modes.

A first waveform 302 in FIG. 3 corresponds to the Drain-Source Voltage ($V_{DS}$) of the second or fourth MOSFET power switch $S_2$ or $S_4$ over time. The Drain-Source Voltage ($V_{DS}$) has a high value (e.g., 48 V) during the first half of the switching cycle and a low value (e.g., 0 V) during the second half.

The second waveform 304 in FIG. 3 corresponds to the current flowing through the resonant inductor ($L_r$) with reference to the first waveform 302 when the LLC resonant converter 200 operates in the first mode (i.e., below the resonant frequency of the resonant tank circuit 204), for example, at 55 KHz.

The third waveform 306 in FIG. 3 corresponds to the current flowing through the resonant inductor ($L_r$) with reference to the first waveform 302 when the LLC resonant converter 200 operates in the second mode (i.e., at the resonant frequency of the resonant tank circuit 204), for example, at 80 KHz.

The fourth waveform 308 in FIG. 3 corresponds to the current flowing through the resonant inductor ($L_r$) with reference to the first waveform 302 when the LLC resonant converter 200 operates in the third mode (i.e., above the resonant frequency of the resonant tank circuit 204), for example, at 125 KHz.

Line 310 is used to illustrate the zero-amp value for the second waveform 304, third waveform 306, and fourth waveform 308. The portions of the second waveform 304, third waveform 306, and fourth waveform 308 above line 310 have a positive current amplitude. In contrast, the portions of the second waveform 304, third waveform 306, and fourth waveform 308 below line 310 have a negative current amplitude.

It is observable that the current flowing through the resonant inductor ($L_r$) has a different behavior with respect to the Drain-Source Voltage ($V_{DS}$) at the three different operating modes. Although the embodiments disclosed herein are described in reference to the rising edge or falling edge of the Drain-Source Voltage ($V_{DS}$) (i.e., first waveform 302) at one of the power switches of the switching bridge, it should be noted that the rising edge or falling edge of the pulse-frequency modulation (PFM) signal at the power switches can also be used as a reference point.

First, the peak (i.e., max) current amplitude of the second waveform 304 is near the rising edge of the first waveform 302, the peak (i.e., max) current amplitude of the third waveform 306 is approximately at the halfway point between the rising and the falling edges of the first waveform 302, and the peak (i.e., max) current amplitude of the fourth waveform 308 is near the falling edge of the first waveform 302.

Second, the zero-cross point for the second waveform 304 (i.e., the point in time when the second waveform 304) transitions from a negative value to a positive value (i.e., where second waveform 304 intersects with line 310) is before the rising edge of the first waveform 302. In contrast, the zero-cross point for the third waveform 306 (i.e., the point in time when the third waveform 306) transitions from a negative value to a positive value (i.e., where third waveform 306 intersects with line 310) appears after the rising edge of the first waveform 302. Similarly, the zero-cross point for the fourth waveform 308 (i.e., the point in time when the second waveform 304) transitions from a negative value to a positive value (i.e., where fourth waveform 308 intersects with line 310) occurs after the rising edge of the first waveform 302, but also after the zero-cross point for the third waveform 306.

Thus, by monitoring the rising and falling edges of the Drain-Source Voltage ($V_{DS}$) of low side MOSFET power switches of the switching bridge 202 at each cycle and setting the switching frequency such that the peak current amplitude of the current flowing through the resonant inductor ($L_r$) is approximately at the halfway point between the rising and falling edges of the monitored Drain-Source Voltage ($V_{DS}$), we can force the LLC resonant converter 200 to operate at peak efficiency.

Further, by monitoring the rising edge of the Drain-Source Voltage ($V_{DS}$) of low side MOSFET power switches of the switching bridge 202 and setting the switching frequency such that the zero-cross point of the current flowing through the resonant inductor ($L_r$) is after a set duration after the rising edge of the monitored Drain-Source Voltage ($V_{DS}$), we can force the LLC resonant converter 200 to operate at peak efficiency.

Figure 4:
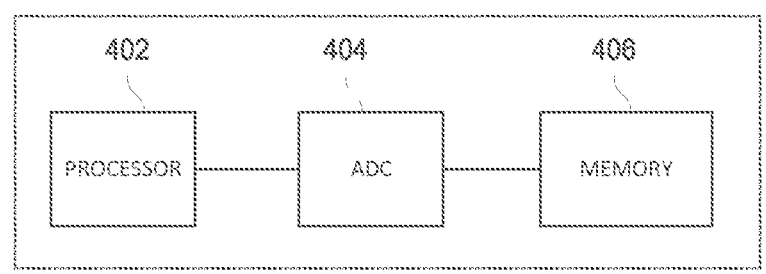
FIG. 4 is a block diagram of a control circuit coupled to the multi-stage power conversion system of FIG. 1.

FIG. 4 illustrates a block diagram of a control circuit 400 coupled to the multi-stage power conversion system 100. The control circuit 400 includes a processor 402 (e.g., a microcontroller unit (MCU), a controller, or a processing system), an analog to digital converter (ADC) 404, and a memory 406, which may (or may not) be arranged as shown. The control circuit 400 may include additional components not depicted, such as an amplifier, a filter circuit, long-term storage (e.g., non-volatile memory, etc.), measurement circuitry, and the like.

Processor 402 may be any component or collection of components adapted to perform computations or other processing-related tasks. Memory 406 may be any component or collection of components adapted to store programming or instructions for execution by the processor 402. In an embodiment, memory 406 includes a non-transitory computer-readable medium.

In embodiments, the current flowing through the resonant inductor ($L_r$) or a representation of the current is received by ADC 404. ADC 404 is configured to digitally represent the current to processor 402.

It is noted that production variations of the resonant tank circuit 204 components (e.g., the variations in the values of the resonant inductor ($L_r$), the resonant capacitor ($C_r$), and the magnetizing inductor ($L_m$)) can result in variations in the characteristics of the time elapsed between the current flowing through the resonant inductor ($L_r$) (i.e., peak value and zero-crossing point) to the rising edge or falling edge of the Drain-Source Voltage ($V_{DS}$).

In embodiments, memory 406 is configured to store a predetermined value or range of values in one or more registers. The predetermined value or range of values are determined during production or manufacturing, corresponding to the time elapsed from the rising edge of the Drain-Source Voltage ($V_{DS}$) to the zero-crossing point of the current for the LLC resonant converter 200 to operate at peak efficiency. In embodiments, memory 406 stores a range of predetermined values in the form of a look-up table that allow the LLC resonant converter 200 to operate at near-peak efficiency. In embodiments, the half-cycle, full-cycle, or the duration between the rising and falling edges of the Drain-Source Voltage ($V_{DS}$) are stored in memory 406.

In embodiments, processor 402 is configured to process the output of ADC 404 and compare the processed values to the predetermined values stored in memory 406 to set the switching frequency of the switching bridge 202.

In embodiments, processor 402 is configured to determine the time elapsed between the rising edge of the Drain-Source Voltage ($V_{DS}$) and the zero-crossing point of the current (or a representation of the current), compare the elapsed time with the predetermined value stored in memory 406, and adjust the switching frequency such that the resonant tank circuit 204 is operating at the resonant frequency and, thus, the LLC resonant converter 200 is operating at peak efficiency. The switching frequency is adjusted until the elapsed time matches the predetermined value or one of the acceptable predetermined values in the range of values stored in memory 406.

In some embodiments, processor 402 is configured to determine whether the peak value of the current (or a representation of the current) is at, or near, the halfway point between the rising and falling edges of the Drain-Source Voltage ($V_{DS}$) and adjust the switching frequency such that the resonant tank circuit 204 is operating at the resonant frequency and, thus, the LLC resonant converter 200 is operating at peak efficiency. The switching frequency is adjusted until the peak value of the current (or a representation of the current) is at, or near, the halfway point between the rising and falling edges of the Drain-Source Voltage ($V_{DS}$).

In other embodiments, processor 402 is configured to determine the time elapsed between the rising edge of the Drain-Source Voltage ($V_{DS}$) and the zero-crossing point of the current (or a representation of the current), compare the elapsed time with the predetermined value stored in memory 406, and adjust the switching frequency until the elapsed time matches the predetermined value or one of the acceptable predetermined values stored in memory 406. Processor 402 is further configured to determine whether the peak value of the current (or a representation of the current) is at, or near, the halfway point between the rising and falling edges of the Drain-Source Voltage ($V_{DS}$) based on the adjusted switching frequency and further modify the switching frequency until the peak value of the current (or a representation of the current) is at, or near, the halfway point between the rising and falling edges of the Drain-Source Voltage ($V_{DS}$).

In embodiments, processor 402 is configured to determine whether the peak value of the current (or a representation of the current) is at, or near, the halfway point between the rising and falling edges of the Drain-Source Voltage ($V_{DS}$) and adjust the switching frequency until the peak value of the current (or a representation of the current) is at, or near, the halfway point between the rising and falling edges of the Drain-Source Voltage ($V_{DS}$). Processor 402 is further configured to determine the time elapsed between the rising edge of the Drain-Source Voltage ($V_{DS}$) and the zero-crossing point of the current (or a representation of the current), compare the elapsed time with the predetermined value stored in memory 406 based on the adjusted switching frequency and further modify the switching frequency until the elapsed time matches the predetermined value or one of the acceptable predetermined values stored in memory 406.

In embodiments, the current and voltages are monitored cycle by cycle. In other embodiments, the current and voltages are monitored after the passage of multiple cycles to reduce the processing workload. In embodiments, the current and voltage are monitored for multiple cycles and the switching frequency is adjusted based on an average of the values measured across the cycles. In embodiments, the current and voltages are monitored only during a boot-up sequence of the multi-stage power conversion system 100.

In embodiments, the control circuit 400 is a standalone circuit operating within a host electronic device. In some embodiments, the control circuit 400 is part of the core processing system of the host electronic device. In other embodiments, the control circuit 400 and the multi-stage power conversion system 100, the LLC resonant converter 200, the DC-AC converter 104, or a combination thereof, are arranged in the same package.

In embodiments, the control circuit 400 performs additional instructions for operating the multi-stage power conversion system 100. For example, the control circuit 400 may monitor the output voltage of the LLC resonant converter 200 to determine whether it is within a safe operating range (e.g., 325 and 400 V) for the DC-AC converter 104 and, in response to the voltage being outside of this range (e.g., greater than 425 V), the control circuit 400 may signal an error indicating that the input to the DC-AC converter 104 is outside of the safe zone.

Figure 5:
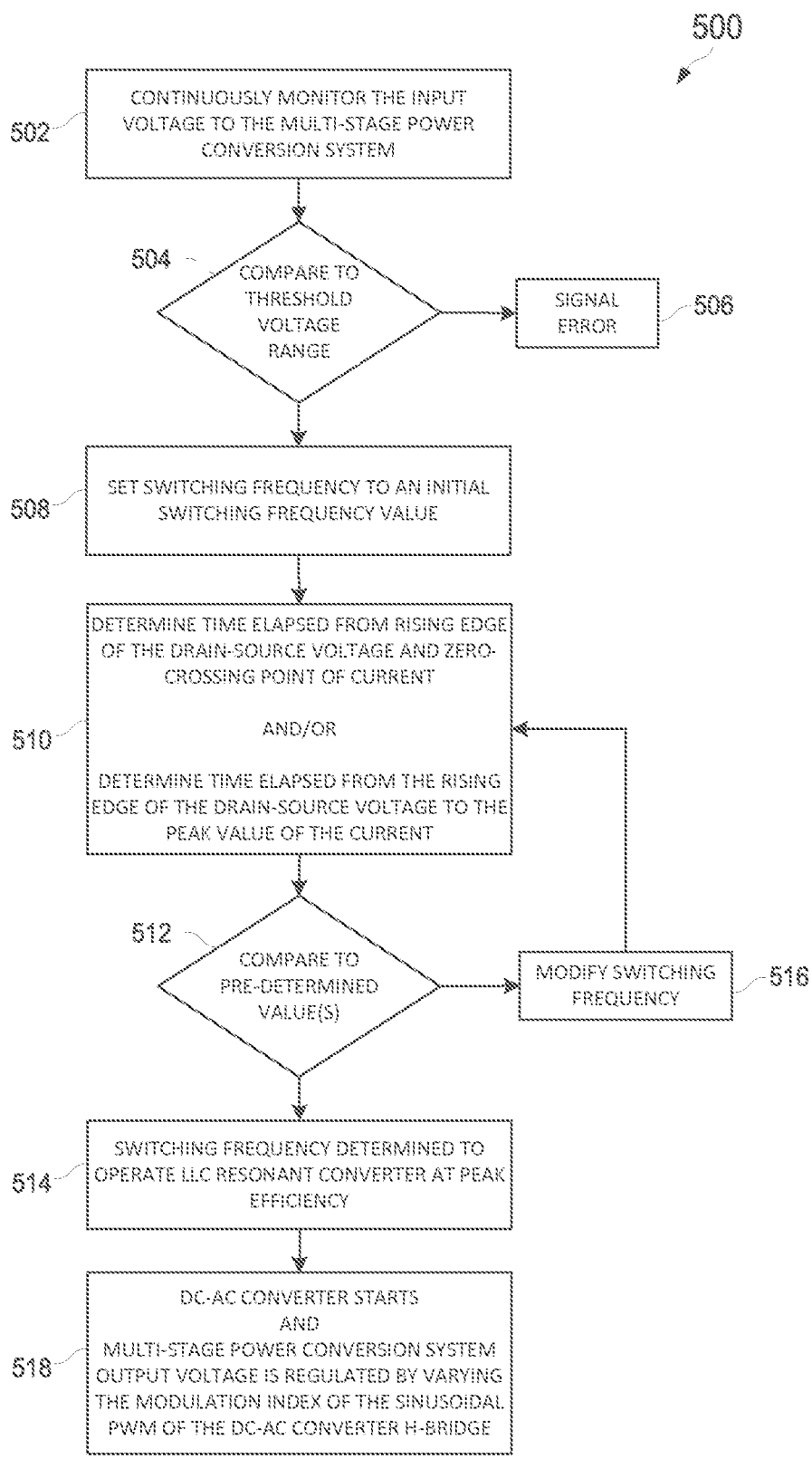
FIG. 5 is a flow chart of an embodiment method to operate the multi-stage power conversion system according to the embodiments disclosed herein.

FIG. 5 illustrates a flow chart of an embodiment method 500 to operate the multi-stage power conversion system 100 according to the embodiments disclosed herein. Optionally, at step 502, the control circuit 400 continuously monitors the input voltage ($V_{in}$) to the multi-stage power conversion system 100. Step 504 compares the input voltage (Vin) to a threshold voltage range. At step 506, if the input voltage ($V_{in}$) is outside the threshold voltage range, the control circuit 400 signals an error, indicating that the input voltage ($V_{in}$) is outside the operating range of the multi-stage power conversion system 100.

In embodiments, steps 508 through 518 are performed once during a boot-up sequence of the multi-stage power conversion system 100. In some embodiments, these steps are performed continuously during the operation of the multi-stage power conversion system 100. In some embodiments, the system is triggered to perform these steps in response to a change in, for example, load conditions, the input voltage, or the like.

At step 508, if the input voltage ($V_{in}$) is within a threshold voltage range, the control circuit 400 sets the switching frequency (i.e., pulse-frequency modulation (PFM) signal) of switching bridge 202 to an initial switching frequency value at, for example, 250 kilohertz (KHz).

In embodiments, the initial switching frequency is a maximum acceptable frequency value, a minimum acceptable frequency value, or a value in between. The initial switching frequency can be a configurable variable. In embodiments, the initial switching frequency is predetermined during production and stored in memory 406 or memory coupled to the control circuit 400. Setting the initial switching frequency at step 508 begins the soft-start of the LLC resonant converter 200 in a frequency sweep sequence.

At step 510, in a first embodiment, processor 402 is configured to determine the time elapsed between the rising edge of the Drain-Source Voltage ($V_{DS}$) and the zero-crossing point of the current (or a representation of the current). At step 512, the determined elapsed time is compared with the predetermined value or range of values stored in memory 406. At step 514, if the values match or are within a threshold range (e.g., 5%), the resonant point of the resonant tank circuit 204 is determined and the switching frequency of the switching bridge 202 is set. In contrast, if the values do not match or are outside of the threshold range, at step 516, the switching frequency of switching bridge 202 is reduced (i.e., when the initial switching frequency is set to the maximum switching frequency value) or increased (i.e., when the initial switching frequency is set to the minimum switching frequency value) by, for example, 1 KHz. In embodiments, the threshold range is configurable and stored in, for example, memory 406.

At step 510, in a second embodiment, the time elapsed from the rising edge of the Drain-Source Voltage ($V_{DS}$) to the peak value of the current (or a representation of the current) is measured. At step 512, the measured time is compared with the halfway time between the rising and falling edges of the Drain-Source Voltage ($V_{DS}$). At step 514, if the values match within a threshold range (e.g., within 5%), the resonant point of the resonant tank circuit 204 is determined and the switching frequency of the switching bridge 202 is set. In contrast, if the values fall outside of the threshold range, at step 516, the switching frequency of switching bridge 202 is reduced (i.e., when the initial switching frequency is set to the maximum switching frequency value) or increased (i.e., when the initial switching frequency is set to the minimum switching frequency value) by, for example, 1 KHz. In embodiments, the threshold range is configurable and stored in, for example, memory 406.

At step 510, in a third embodiment, processor 402 is configured to determine the time elapsed between the rising edge of the Drain-Source Voltage ($V_{DS}$) and the zero-crossing point of the current (or a representation of the current). Further, processor 402 is configured to measure the time elapsed from the rising edge of the Drain-Source Voltage ($V_{DS}$) to the peak value of the current (or a representation of the current) is measured. At step 512, (i) the determined elapsed time is compared with the predetermined value or range of values stored in memory 406 and (ii) the measured time is compared with the halfway time between the rising and falling edges of the Drain-Source Voltage ($V_{DS}$). At step 514, if the values match or are within a threshold range (e.g., 5%), the resonant point of the resonant tank circuit 204 is determined and the switching frequency of the switching bridge 202 is set. In contrast, if the values do not match or are outside of the threshold range, at step 516, the switching frequency of switching bridge 202 is reduced (i.e., when the initial switching frequency is set to the maximum switching frequency value) or increased (i.e., when the initial switching frequency is set to the minimum switching frequency value) by, for example, 1 KHz. In embodiments, the threshold range is configurable and stored in, for example, memory 406.

In embodiments, the current flowing through the resonant inductor ($L_r$) is measured using a capacitive sensor when the switching bridge 202 is configured as a half-bridge because the resonant capacitor ($C_r$) is referenced to a ground reference (i.e., single-ended).

Figure 6:
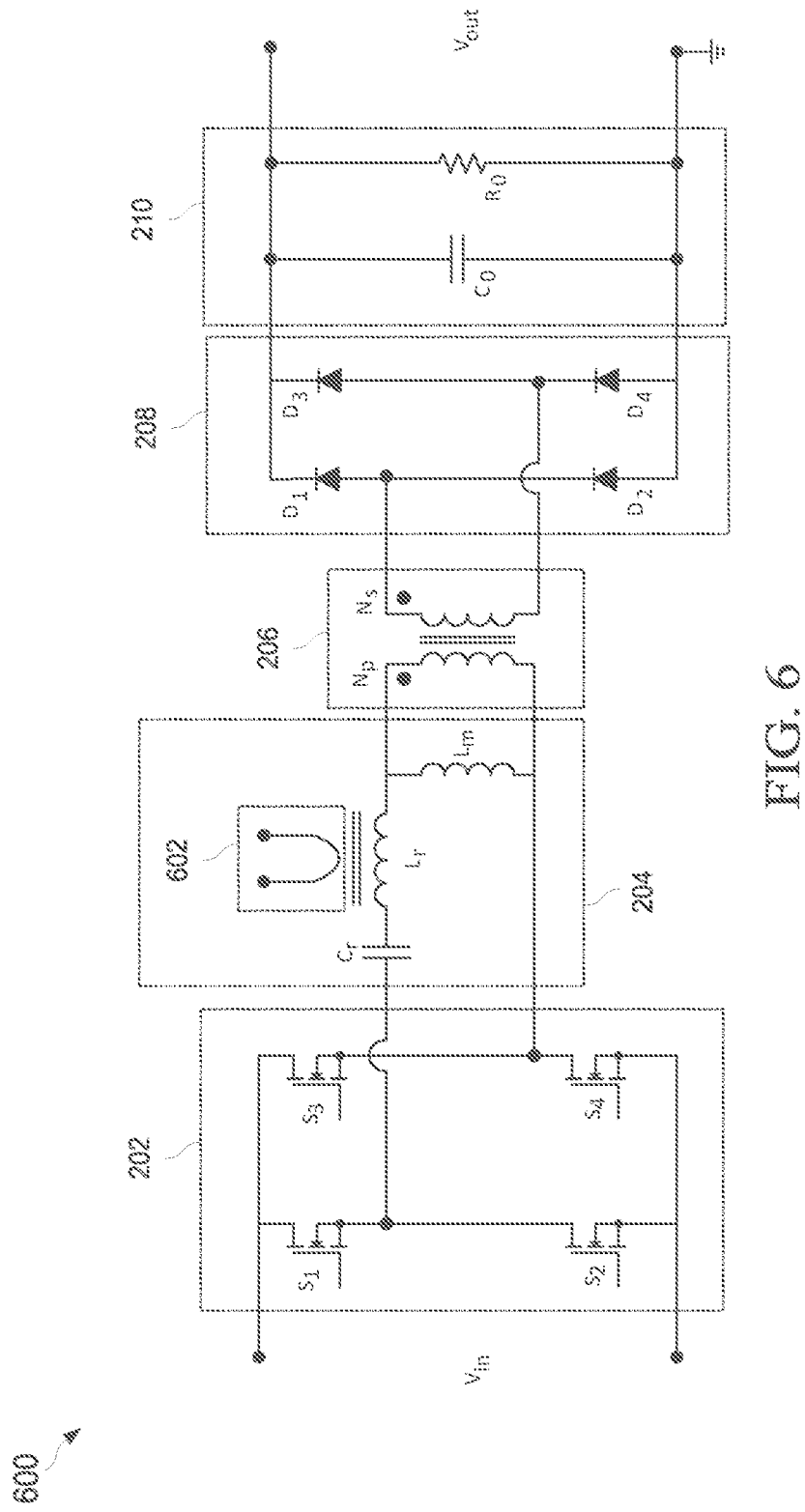
FIG. 6 is a simplified schematic of an embodiment LLC resonant converter.

In embodiments, the current flowing through the resonant inductor ($L_r$) is indirectly measured, for example, as described in FIG. 6, when the switching bridge 202 is configured as a full-bridge.

In embodiments, the frequency increment or decrement value is configurable. Steps 512 and 516 are repeated until the values match at step 514. In embodiments, the switching frequency of the switching bridge 202 corresponding to the resonant point of the resonant tank circuit is stored in memory 406 or in memory storage coupled to control circuit 400.

The sequence of steps to adjust the switching frequency is not limited to the frequency sweep outlined hereinabove. For example, the initial frequency can be a midpoint value (e.g., 125 KHz), and the switching frequency can be adjusted based on comparing the measured and the predetermined values and using the previous adjustments. The switching frequency can then be increased or decreased to, for example, shift the peak of the current or the zero-cross pointing by monitoring changes using processor 402.

At step 518, the DC-AC converter 104 of the H-bridge type becomes operational, and the output voltage ($V_{out}$) of the multi-stage power conversion system 100 is regulated by varying the modulation index of the sinusoidal pulse-width modulated (PWM) control signal at the H-bridge DC-AC converter 104. In embodiments, the control circuit 400 is configured to continuously monitor the output voltage ($V_{out}$) of the multi-stage power conversion system 100 and set the modulation index to achieve the desired output voltage.

Advantageously, by continuously monitoring the zero-cross point with respect to the leading edge of the pulse-frequency modulation (PFM) signal of the switching bridge 202, the control circuit 400 can be configured to track whether the LLC resonant converter 200 is entering into a dangerous capacitive region. In response, control circuit 400 can adjust the multi-stage power conversion system 100 or signal an alert to indicate an error, providing additional protection to the system.

It is noted that all steps outlined are not necessarily required and can be optional. Further, changes to the arrangement of the steps, removal of one or more steps and path connections, and addition of steps and path connections are similarly contemplated.

FIG. 6 illustrates a simplified schematic of an embodiment LLC resonant converter 600, which uses a representation of the current flowing through the resonant inductor ($L_r$) instead of measuring the current directly. LLC resonant converter 600 is substantially the same as LLC resonant converter 200. Thus, the function and structure of the common components are not repeated.

Resonant current sensing circuit 602 is used instead of a current transformer (CT) to sense the current flowing through the resonant inductor ($L_r$). Typically, a current transformer is used to sense and measure current flow in power supply systems. The primary function of the current transformer is to prevent overcurrent conditions and monitor and control the power supply circuits. A current transformer produces an alternating current in a secondary winding proportional to the current in the primary winding (e.g., resonant inductor ($L_r$)). As the structure of the primary and secondary windings are known, the current in each is linked, and by measuring the current in the secondary winding, the current in the primary winding can be determined. This is advantageous where the current in the primary winding is a large current and the primary winding can transform the large current to a more manageable current to be measured at the secondary winding.

In an LLC resonant converter designed to operate at high-input voltages, the inductance value of the requisite current transformer is significantly smaller than the resonant inductor ($L_r$). In contrast, in an LLC resonant converter designed to operate at low-input voltages (e.g., high-power applications), such as a DC-DC LLC step-up power converter operating from 12/24/48 volt battery sources, the inductance value of the requisite current transformer becomes comparable with the resonant inductor ($L_r$). The large inductance associated with the primary winding of the current transformer changes the effective resonant inductance of the resonant tank circuit 204, which results in a change of operation of the LLC resonant converter 600. Even at smaller inductance values, the primary winding effectively modifies the resonant inductance and stores energy in proportion to its inductance value. The energy storage in a small-size current transformer generates heat due to the high volt-time product across the current sense windings, which can result in system failure.

LLC resonant converter 600 includes a resonant current sensing circuit 602 that indirectly senses the behavior of the current flowing through the resonant inductor ($L_r$). Resonant current sensing circuit 602 includes a one-turn auxiliary winding inductively coupled to the resonant inductor ($L_r$). Depending on the ratio of the windings between the resonant inductor ($L_r$) and the one-turn auxiliary winding of the resonant current sensing circuit 602, the voltage across the one-turn auxiliary winding can be scaled down to a voltage value within the operating range of the ADC 404.

The control circuit 400 is coupled to the resonant current sensing circuit 602 in embodiments to monitor the behavior of the current flowing through the resonant inductor ($L_r$). The voltage across the resonant current sensing circuit 602 represents the current flowing through the resonant inductor ($L_r$). In embodiment, the voltage is scaled down before being converted by the ADC 404 to a digital signal and processed by processor 402. In embodiments, the resonant current sensing circuit 602 is coupled to an inverting end of a comparator to sense for over-current protection.

In embodiments, a ±40 A current flowing through the resonant inductor ($L_r$) is converted to a voltage between 0.9 and 2.7 volts.

Advantageously, the resonant current sensing circuit 602 is more compact than the current transformer, has high efficiency (in combination with the LLC resonant converter), provides isolation, and is cost-effective compared to other solutions such as the use of a Hall sensor, a current sense transformer, and a shunt resistor.

A first aspect relates to an LLC resonant converter. The LLC resonant converter includes a switching bridge having a plurality of power switches. The switching bridge is configured to receive a DC voltage input and generate a square waveform based on a pulse-modulated frequency (PFM) signal at the switching bridge. The LLC resonant converter further includes a resonant tank circuit coupled to the switching bridge. The resonant tank circuit includes a resonant inductor. The resonant tank circuit is excited in response to receiving the square waveform. The PFM signal is adjusted such that an elapsed time between a rising edge of a Drain-Source Voltage of a power switch and a zero-crossing point of current flowing through the resonant inductor falls within a predetermined range corresponding to the resonant tank circuit operating at its resonant frequency.

In a first implementation form of the LLC resonant converter according to the first aspect as such, the switching bridge is arranged in a half-bridge or a full-bridge topology.

In a second implementation form of the LLC resonant converter according to the first aspect as such or any preceding implementation form of the first aspect, an H-bridge DC-AC converter is couplable to the LLC resonant converter. A modulation index of a sinusoidal pulse-width-modulated (PWM) control signal at the H-bridge DC-AC converter is varied to regulate its output voltage.

In a third implementation form of the LLC resonant converter according to the first aspect as such or any preceding implementation form of the first aspect, the elapsed time is a first elapsed time. The predetermined range is a first predetermined range. Adjusting the PFM signal includes determining a second elapsed time from the rising edge of the Drain-Source Voltage to a peak value of current flowing through the resonant inductor and adjusting the PFM signal such that the first elapsed time falls within the first predetermined range and the second elapsed time falls within a second predetermined range corresponding to the resonant tank circuit operating at the resonant frequency.

In a fourth implementation form of the LLC resonant converter according to the first aspect as such or any preceding implementation form of the first aspect, adjusting the PFM signal comprises sweeping a frequency of the PFM signal across a frequency range.

In a fifth implementation form of the LLC resonant converter according to the first aspect as such or any preceding implementation form of the first aspect, the predetermined range is stored in a register of a control circuit couplable to the LLC resonant converter. The predetermined range is determining during production of the LLC resonant converter.

In a sixth implementation form of the LLC resonant converter according to the first aspect as such or any preceding implementation form of the first aspect, the LLC resonant converter further includes a resonant current sensing circuit configured to generate a representative voltage signal of current flowing through the resonant inductor. The resonant current sensing circuit includes a one-turn auxiliary winding inductively coupled to the resonant inductor.

A second aspect relates to a multi-stage power conversion system. The multi-stage power conversion system includes an LLC resonant converter, an H-bridge DC-AC converter, and a control circuit. The LLC resonant converter includes a switching bridge and a resonant tank circuit. The H-bridge DC-AC converter is coupled to the LLC resonant converter. The H-bridge DC-AC converter is configured to generate a regulated output voltage. The control circuit is configured to determine an elapsed time between a rising edge of a Drain-Source Voltage (VDS) of a power switch in the switching bridge and a zero-crossing point of current flowing through a resonant inductor in the resonant tank circuit; adjust a pulse-frequency modulation (PFM) signal at the switching bridge such that the elapsed time falls within a predetermined range corresponding to the resonant tank circuit operating at its resonant frequency; and regulate an output voltage of the H-bridge DC-AC converter by varying a modulation index of a sinusoidal pulse-width-modulated (PWM) control signal at the H-Bridge DC-AC converter.

In a first implementation form of the multi-stage power conversion system according to the second aspect as such, the elapsed time is a first elapsed time. The predetermined range is a first predetermined range. Adjusting the PFM signal includes determining a second elapsed time from the rising edge of the Drain-Source Voltage to a peak value of current flowing through the resonant inductor and adjusting the PFM signal such that the first elapsed time falls within the first predetermined range and the second elapsed time falls within a second predetermined range corresponding to the resonant tank circuit operating at the resonant frequency.

In a second implementation form of the multi-stage power conversion system according to the second aspect as such or any preceding implementation form of the second aspect, adjusting the PFM signal comprises sweeping frequency of the PFM signal across a frequency range.

In a third implementation form of the multi-stage power conversion system according to the second aspect as such or any preceding implementation form of the second aspect, the control circuit is further configured to compare an input voltage to the multi-stage power conversion system to a threshold range and generate a signal indicating that the input voltage is outside an operating range of the multi-stage power conversion system in response to the input voltage being outside the threshold range.

In a fourth implementation form of the multi-stage power conversion system according to the second aspect as such or any preceding implementation form of the second aspect, the multi-stage power conversion system includes a resonant current sensing circuit configured to generate a representative voltage signal of current flowing through the resonant inductor. The resonant current sensing circuit includes a one-turn auxiliary winding inductively coupled to the resonant inductor.

In a fifth implementation form of the multi-stage power conversion system according to the second aspect as such or any preceding implementation form of the second aspect, the LLC resonant converter is a DC-DC LLC step-up power converter coupled to an output of a DC power source operating at 12, 24, or 48 volts.

In a sixth implementation form of the multi-stage power conversion system according to the second aspect as such or any preceding implementation form of the second aspect, the control circuit includes a processor configured to execute instructions to operate the multi-stage power conversion system; an analog-to-digital converter (ADC) configured to convert analog current and voltage measurements from the multi-stage power conversion system to digital values; and a memory storage configured to store the predetermined range.

A third aspect relates to a method for operating a multi-stage power conversion system comprising an LLC resonant converter and an H-bridge DC-AC converter. The method includes determining an elapsed time between a rising edge of a Drain-Source Voltage (VDS) of a power switch in a switching bridge of the LLC resonant converter and a zero-crossing point of current flowing through a resonant inductor in a resonant tank circuit of the LLC resonant converter; adjusting a pulse-frequency modulation (PFM) signal at the switching bridge such that the elapsed time falls within a predetermined range corresponding to the resonant tank circuit operating at its resonant frequency; and regulating an output voltage of the H-bridge DC-AC converter by varying a modulation index of a sinusoidal pulse-width-modulated (PWM) control signal at the H-Bridge DC-AC converter.

In a first implementation form of the method according to the third aspect as such, the elapsed time is a first elapsed time. The predetermined range is a first predetermined range. Adjusting the PFM signal includes determining a second elapsed time from the rising edge of the Drain-Source Voltage to a peak value of current flowing through the resonant inductor and adjusting the PFM signal such that the first elapsed time falls within the first predetermined range and the second elapsed time falls within a second predetermined range corresponding to the resonant tank circuit operating at the resonant frequency.

In a second implementation form of the method according to the third aspect as such or any preceding implementation form of the third aspect, adjusting the PFM signal includes sweeping a frequency of the PFM signal across a frequency range.

In a third implementation form of the method according to the third aspect as such or any preceding implementation form of the third aspect, the method further includes comparing an input voltage to the multi-stage power conversion system to a threshold range; and generating a signal indicating that the input voltage is outside an operating range of the multi-stage power conversion system in response to the input voltage being outside the threshold range.

In a fourth implementation form of the method according to the third aspect as such or any preceding implementation form of the third aspect, the method further includes generating, by a resonant current sensing circuit, a representative voltage signal of current flowing through the resonant inductor, the resonant sensing circuit comprising a one-turn auxiliary winding inductively coupled to the resonant inductor.

In a fifth implementation form of the method according to the third aspect as such or any preceding implementation form of the third aspect, adjusting the PFM signal includes comparing the elapsed time with the predetermined range at a start of each cycle of the PFM signal and sweeping a frequency of the PFM signal such that the elapsed time matches the predetermined range.

A fourth aspect relates to an LLC resonant converter. The LLC resonant converter includes a switching bridge having a plurality of power switches. The switching bridge is configured to receive a DC voltage input and generate a square waveform based on a pulse-modulated frequency (PFM) signal at the switching bridge. The LLC resonant converter further includes a resonant tank circuit coupled to the switching bridge and comprising a resonant inductor. The resonant tank circuit is excited in response to receiving the square waveform. The PFM signal is adjusted such that an elapsed time from a rising edge of a Drain-Source Voltage of a power switch to a peak value of current flowing through the resonant inductor falls within a predetermined range corresponding to the resonant tank circuit operating at its resonant frequency.

A fifth aspect relates to a multi-stage power conversion system. The multi-stage power conversion system includes an LLC resonant converter, an H-bridge DC-AC converter, and a control circuit. The LLC resonant converter includes a switching bridge and a resonant tank circuit. The H-bridge DC-AC converter is coupled to the LLC resonant converter. The H-bridge DC-AC converter is configured to generate a regulated output voltage. The control circuit is configured to determine an elapsed time from a rising edge of a Drain-Source Voltage of a power switch in the switching bridge to a peak value of current flowing through a resonant inductor of the resonant tank circuit; adjust a pulse-frequency modulation (PFM) signal at the switching bridge such that the elapsed time falls within a predetermined range corresponding to the resonant tank circuit operating at its resonant frequency; and regulate an output voltage of the H-bridge DC-AC converter by varying a modulation index of a sinusoidal pulse-width-modulated (PWM) control signal at the H-Bridge DC-AC converter.

A sixth aspect relates to a method for operating a multi-stage power conversion system comprising an LLC resonant converter and an H-bridge DC-AC converter. The method includes determining an elapsed time from a rising edge of a Drain-Source Voltage of a power switch of a switching bridge in the LLC resonant converter to a peak value of current flowing through a resonant inductor of a resonant tank circuit in the LLC resonant converter; adjusting a pulse-frequency modulation (PFM) signal at the switching bridge such that the elapsed time falls within a predetermined range corresponding to the resonant tank circuit operating at its resonant frequency; and regulating an output voltage of the H-bridge DC-AC converter by varying a modulation index of a sinusoidal pulse-width-modulated (PWM) control signal at the H-Bridge DC-AC converter.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An LLC resonant converter, comprising:
a switching bridge having a plurality of power switches, the switching bridge configured to receive a DC voltage input and generate a square waveform based on a pulse-modulated frequency (PFM) signal at the switching bridge; and
a resonant tank circuit coupled to the switching bridge and comprising a resonant inductor, wherein the resonant tank circuit is excited in response to receiving the square waveform, and wherein the PFM signal is adjusted such that an elapsed time between a rising edge of a Drain-Source Voltage of a power switch and a zero-crossing point of current flowing through the resonant inductor falls within a predetermined range corresponding to the resonant tank circuit operating at its resonant frequency.

2. The LLC resonant converter of claim 1, wherein the switching bridge is arranged in a half-bridge or a full-bridge topology.

3. The LLC resonant converter of claim 1, wherein an H-bridge DC-AC converter is couplable to the LLC resonant converter, wherein a modulation index of a sinusoidal pulse-width-modulated (PWM) control signal at the H-bridge DC-AC converter is varied to regulate its output voltage.

4. The LLC resonant converter of claim 1, wherein the elapsed time is a first elapsed time, wherein the predetermined range is a first predetermined range, and wherein adjusting the PFM signal comprises:
determining a second elapsed time from the rising edge of the Drain-Source Voltage to a peak value of current flowing through the resonant inductor; and
adjusting the PFM signal such that the first elapsed time falls within the first predetermined range and the second elapsed time falls within a second predetermined range corresponding to the resonant tank circuit operating at the resonant frequency.

5. The LLC resonant converter of claim 1, wherein adjusting the PFM signal comprises sweeping a frequency of the PFM signal across a frequency range.

6. The LLC resonant converter of claim 1, wherein the predetermined range is stored in a register of a control circuit couplable to the LLC resonant converter, and wherein the predetermined range is determined during production of the LLC resonant converter.

7. The LLC resonant converter of claim 1, further comprising a resonant current sensing circuit configured to generate a representative voltage signal of current flowing through the resonant inductor, the resonant current sensing circuit comprising a one-turn auxiliary winding inductively coupled to the resonant inductor.

8. A multi-stage power conversion system, comprising:
an LLC resonant converter comprising a switching bridge and a resonant tank circuit;
an H-bridge DC-AC converter coupled to the LLC resonant converter, the H-bridge DC-AC converter configured to generate a regulated output voltage; and
a control circuit configured to:
determine an elapsed time between a rising edge of a Drain-Source Voltage ($V_{DS}$) of a power switch in the switching bridge and a zero-crossing point of current flowing through a resonant inductor in the resonant tank circuit,
adjust a pulse-frequency modulation (PFM) signal at the switching bridge such that the elapsed time falls within a predetermined range corresponding to the resonant tank circuit operating at its resonant frequency, and
regulate an output voltage of the H-bridge DC-AC converter by varying a modulation index of a sinusoidal pulse-width-modulated (PWM) control signal at the H-Bridge DC-AC converter.

9. The multi-stage power conversion system of claim 8, wherein the elapsed time is a first elapsed time, wherein the predetermined range is a first predetermined range, and wherein adjusting the PFM signal comprises:
determining a second elapsed time from the rising edge of the Drain-Source Voltage to a peak value of current flowing through the resonant inductor; and
adjusting the PFM signal such that the first elapsed time falls within the first predetermined range and the second elapsed time falls within a second predetermined range corresponding to the resonant tank circuit operating at the resonant frequency.

10. The multi-stage power conversion system of claim 8, wherein adjusting the PFM signal comprises sweeping a frequency of the PFM signal across a frequency range.

11. The multi-stage power conversion system of claim 8, wherein the control circuit is further configured to:
compare an input voltage of the multi-stage power conversion system to a threshold range; and
generate a signal indicating that the input voltage is outside an operating range of the multi-stage power conversion system in response to the input voltage being outside the threshold range.

12. The multi-stage power conversion system of claim 8, further comprising a resonant current sensing circuit configured to generate a representative voltage signal of current flowing through the resonant inductor, the resonant current sensing circuit comprising a one-turn auxiliary winding inductively coupled to the resonant inductor.

13. The multi-stage power conversion system of claim 12, wherein the LLC resonant converter is a DC-DC LLC step-up power converter coupled to an output of a DC power source operating at 12, 24, or 48 volts.

14. The multi-stage power conversion system of claim 8, wherein the control circuit comprises:
a processor configured to execute instructions to operate the multi-stage power conversion system;
an analog-to-digital converter (ADC) configured to convert analog current and voltage measurements from the multi-stage power conversion system to digital values; and
a memory storage configured to store the predetermined range.

15. A method for operating a multi-stage power conversion system comprising an LLC resonant converter and an H-bridge DC-AC converter, the method comprising:
determining an elapsed time between a rising edge of a Drain-Source Voltage ($V_{DS}$) of a power switch in a switching bridge of the LLC resonant converter and a zero-crossing point of current flowing through a resonant inductor in a resonant tank circuit of the LLC resonant converter;
adjusting a pulse-frequency modulation (PFM) signal at the switching bridge such that the elapsed time falls within a predetermined range corresponding to the resonant tank circuit operating at its resonant frequency; and regulating an output voltage of the H-bridge DC-AC converter by varying a modulation index of a sinusoidal pulse-width-modulated (PWM) control signal at the H-Bridge DC-AC converter.

16. The method of claim 15, wherein the elapsed time is a first elapsed time, wherein the predetermined range is a first predetermined range, and wherein adjusting the PFM signal comprises:
determining a second elapsed time from the rising edge of the Drain-Source Voltage to a peak value of current flowing through the resonant inductor; and
adjusting the PFM signal such that the first elapsed time falls within the first predetermined range and the second elapsed time falls within a second predetermined range corresponding to the resonant tank circuit operating at the resonant frequency.

17. The method of claim 15, wherein adjusting the PFM signal comprises sweeping a frequency of the PFM signal across a frequency range.

18. The method of claim 15, further comprising:
comparing an input voltage of the multi-stage power conversion system to a threshold range; and
generating a signal indicating that the input voltage is outside an operating range of the multi-stage power conversion system in response to the input voltage being outside the threshold range.

19. The method of claim 15, further comprising:
generating, by a resonant current sensing circuit, a representative voltage signal of current flowing through the resonant inductor, the resonant current sensing circuit comprising a one-turn auxiliary winding inductively coupled to the resonant inductor.

20. The method of claim 15, wherein adjusting the PFM signal comprises:
comparing the elapsed time with the predetermined range at a start of each cycle of the PFM signal; and
sweeping a frequency of the PFM signal such that the elapsed time matches the predetermined range.

* * * * *